United States Patent [19]
Gottstein et al.

[11] 3,910,899
[45] Oct. 7, 1975

[54] 7-(2-AMINOMETHYLPHENYL-ACETAMIDO)-3-[2-(5-HYDROXYMETHYL-1,3,4-THIADIAZOLYL)-THIOMETHYL]-3-CEPHEM-4-CARBOXYLIC ACID

[75] Inventors: William J. Gottstein, Fayetteville; Murray A. Kaplan, Syracuse; Alphonse P. Granatek, Baldwinsville, all of N.Y.

[73] Assignee: Bristol-Myers Company, New York, N.Y.

[22] Filed: Sept. 7, 1973

[21] Appl. No.: 395,102

[52] U.S. Cl. ........... 260/243 C; 424/246; 260/240 G
[51] Int. Cl.² ...................................... C07D 501/22
[58] Field of Search ................................. 260/243 C

[56] References Cited
UNITED STATES PATENTS
3,766,175   10/1973   Lemieux et al. ................. 260/243 C

*Primary Examiner*—Nicholas S. Rizzo
*Attorney, Agent, or Firm*—Herbert W. Taylor, Jr.

[57] ABSTRACT

7-(2-Aminomethylphenylacetamido-3-(heterocyclic-substituted)thiomethyl-3-cephem-4-carboxylic acids in which the heterocyclic substituent is 2-(1,3,4-thiadiazolyl)- or 2-(5-hydroxymethyl-1,3,4-thiadiazolyl)-, and their nontoxic, pharmaceutically acceptable salts and their Schiff bases, as made by reaction of salicylaldehyde with the free amino group, are valuable as antibacterial agents and are particularly valuable as therapeutic agents in poultry and animals, including man, in the treatment of infectious diseases caused by many Gram-positive and Gram-negative bacteria.

5 Claims, No Drawings

3,910,899

7-(2-AMINOMETHYLPHENYL-ACETAMIDO)-3-[2-(5-HYDROXYMETHYL-1,3,4-T HIADIAZOLYL)-THIOMETHYL]-3-CEPHEM-4-CARBOXYLIC ACID

BACKGROUND OF THE INVENTION

1. Field of the Invention

The cephalosporins of the present invention possess the usual attributes of such compounds and are particularly useful in the treatment of bacterial infections by parenteral administration.

2. Description of the Prior Art

The cephalosporins are a well-known group of semisynethtic antibacterial agents made originally, for example, by acylation of the 7-amino group of the nucleus 7-aminocephalosporanic acid (7-ACA) and later by similar acylation of nuclei derived therefrom, as by modification of its substituent at the 3-position. Various reviews have appeared in the scientific literature (e.g. Cephalosporins and Penicillins — Chemistry and Biology, edited by Edwin H. Flynn, Academic Press, New York, 1972, and particularly pages 554–569) and in the patent literature, e.g. as in U.S. Pat. Nos. 3,687,948 and 3,741,965 (both U.S. Class 260–243C).

Recently issued patents on 3-thiolated cephalosporins in which the 7-substituent is a. α-Amino-α-phenylacetamido include U.S. Pat. Nos. 3,641,021, 3,734,907, 3,687,948, 3,741,965, Japan 7124400 (Farmdoc 46374S), Belgium Pat. No. 776,222 (Farmdoc 38983T), Belgium Pat. No. 772,592 (Farmdoc 19696T), West Germany Pat. No. 2,202,274 (Farmdoc 50428T) corresponding to U.S. Ser. No. 167,534 filed July 29, 1971, Netherlands Pat. No. 7205644 (Farmdoc 76309T); and b. o-, m- or p-aminoethoxyphenylacetamido as Netherlands 72/13968 (Farmdoc 24740U) corresponding to U.S. Ser. No. 189,369 filed Oct. 14, 1971; and c. o-aminomethylphenylacetamido as Netherlands 72/06326 (Farmdoc 76374T) (which also reviews the older patent literature concerning substituted 7-phenylacetamidocephalosporanic acids) corresponding to U.S. Ser. No. 142,337 filed May 11, 1971; and d. N-(phenylacetimidoyl)aminoacetamido as U.S. Pat. No. 3,692,779; and e. α-amino-α-(1,4-cyclohexadienyl)acetamido as in Belgium 776,222 (Farmdoc 38983T).

Additional similar disclosures are found in U.S. Pat. No. 3,692,779 (Belgium Pat. No. 771,189; Farmdoc 12,817T), Japan Pat. No. 72/05550 (Farmdoc 12,921T), Japan 72/05551 (Farmdoc 12,922T), Japan Pat. No. 71/24400(Farmdoc 46,374T), Belgium Pat. No. 776,222 (Farmdoc 38,983T).

Recently issued patents containing a partially hydrogenated benzene ring in the 7-substituent but lacking a thiomethyl group at the 3-position include those in which the 7-substituent is a. 2-(1,4-cyclohexadien-1-yl)acetamido as in U.S. Pat. No. 3,704,297 (Farmdoc 78154T) and Belgium Pat. No. 759,326 (Farmdoc 38,172S); and b. α-amino-α-(1,4-cyclohexadienyl)acetamido and related compounds as in U.S. Pat. No. 3,485,819; West Germany 2,152,745 (Farmdoc 29606T); and c. α-amino-α-(1,2-cyclohexenyl)acetamido as in Belgium 773,773 (Farmdoc 25515T); and d). p-(α-aminoalkyl)phenylacetamido as in U.S. Pat. No. 3,382,241; and e. o-aminomethylphenylthioacetamido as in U.S. Pat. No. 3,657,232.

SUMMARY OF THE INVENTION

This invention comprises the compounds of the formula

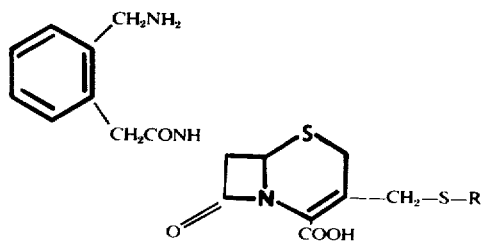

wherein R is

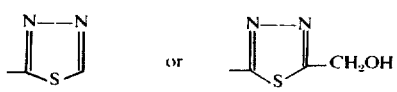

and their nontoxic, pharmaceutically acceptable salts and Schiff bases, as with salicylaldehyde.

Such salts include carboxylic acid salts including nontoxic metallic salts such as sodium, potassium, calcium and aluminum, the ammonium salt and substituted ammonium salts, e.g., salts of such nontoxic amines as trialkylamines, including triethylamine, procaine, dibenzylamine, N-benzylbeta-phenethylamine, 1-ephenamine, N,N'-dibenzylethylenediamine, dehydroabietylamine, N,N'-bisdehydroabietylethylenediamine, N-(lower)-alkylpiperidine, e.g., N-ethylpiperidine, and other amines which have been used to form salts with benzylpenicillin; and in all cases the nontoxic, acid addition salts thereof (i.e., the amine salts) including the mineral acid addition salts such as the hydrochloride, hydrobromide, hydroiodide, sulfate, sulfamate and phosphate and the organic acid addition salts such as the maleate, acetate, citrate, oxalate, succinate, benzoate, tartrate, fumarate, malate, madelate, ascorbate and the like.

The compounds of the present invention are prepared according to the present invention by coupling with a compound of the formula

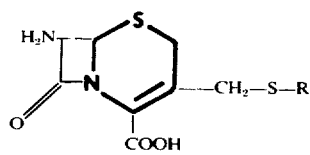

II wherein R has the meaning set out above (or a salt or easily hydrolyzed ester thereof including those of U.S. Pat. No. 3,284,451 and U.K. Pat. No. 1,229,453 and any of the silyl esters described in U.S. Pat. No. 3,249,622 for use with 7-aminopenicillanic acid and used in Great Britain Pat. No. 1,073,530) a particular acid or its functional equivalent as an acylating agent for a primary amino group. After coupling, the blocking group is removed to give the desired product. Said acid has the formula

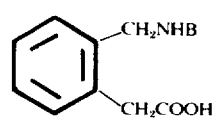

wherein B represents a blocking group of the type used either in peptide syntheses or in any of the numerous syntheses of α-aminobenzylpenicillin from 2-phenylglycine. Particularly valuable blocking groups are a proton, as in the compound of the formula

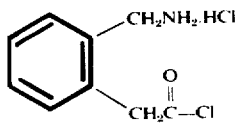

or a β-diketone as in Great Britain Pat. No. 1,123,333, e.g., methyl acetoacetate, in which case the acid containing the blocked amino group is preferably converted to a mixed anhydride, as with ethyl chloroformate, before reaction with compound II or a salt thereof to form the desired product I after acid cleavage.

Further to the discussion above of blocking groups used on the free amino group of the sidechain acid during its coupling with compound II, the blocking group is then removed to form the products of the present invention, e.g., the t-butyoxy-carbonyl group is removed by treatment with formic acid, the carbobenzyloxy group is removed by catalytic hydrogenation, the 2-hydroxy-1-naphthcarbonyl group is removed by acid hydrolysis and the trichloroethoxycarbonyl group by treatment with zinc dust in glacial acetic acid. Obviously, other functionally equivalent blocking groups of an amino group can be used and subh groups are considered within the scope of this invention.

Thus, with respect to said acid to be used to couple with compound II, functional equivalents include the corresponding acid anhydrides, including mixed anhydrides and particularly the mixed anhydrides prepared from stronger acids such as the lower aliphatic monoesters of carbonic acid, or alkyl and aryl sulfonic acids and of more hindered acids such as diphenylacetic acid. In addition, an acid azide or an active ester of thioester (e.g., with p-nitrophenol, 2,4-dinitrophenol, thiophenol, thioacetic acid) may be used or the free acid itself may be coupled with compound II after first reacting said free acid with N,N'-dimethylchloroformiminium chloride [cf. Great Britain, 1,008,170 and Novak and Weichet, Experientia XXI, 6, 360 (1965)] or by the use of enzymes or of an N,N'-carbonyldiimidazole or an N,N'-carbonylditriazole [cf. South African patent specification 63/2684] or a carbodiimide reagent [especially N,N'-dicyclohexylcarbodiimide, N,N'-diisopropylcarbodiimide or N-cyclohexyl-N'-(2-morpholinoethyl)carbodiimide; cf. Sheehan and Hess, J. Amer. Chem. Soc., 77, 1067 (1955)] or of alkylamine reagent [cf. R. Buijle and H.G. Viehe, Angew Chem. International Edition 3, 582 (1964)], or of a ketenimine reagent ]cf. C. L. Stevens and M.E. Mond, J. Amer. Chem. Soc., 80, (4065)] or of an isoxazolium salt reagent ]cf. R. B. Woodward, R. A. Olofson and H. Mayer, J. Amer. Chem. Soc. 83, 1010 (1961)]. Another equivalent of the acid chloride is a corresponding azolide, i.e., an amide of the corresponding acid whose amide nitrogen is a member or an quasiaromatic five-membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield dimidazolide. The by-product, imidazole, precipitates and may be separated and the imidazolide isolated, but this is not essential. The methods for carrying out these reactions to produce a cephalosporin and the methods used to isolate the cephelosporin so produced are well known in the art.

In the treatment of bacterial infections in man, the compounds of this invention are administered parenterally, in accordance with conventional procedures for antibiotic administration, in an amount of from about 5 to 200 mg./kg./day and preferably about 5 to 20 mg./kg./day in divided dosage, e.g., three to four times a day. They are administered in dosage units containing, for example, 125 or 250 or 500 mg. of active ingredient with suitable physiologically acceptable carriers or excipients. The dosage units are in the form of liquid preparations such as solutions or suspensions.

The present invention provides for the production of the new compounds therein by the processes of the following reaction scheme:

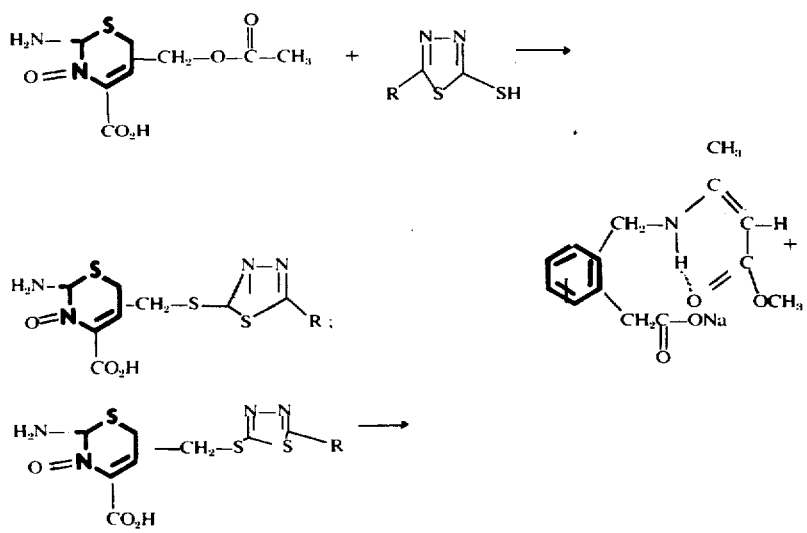

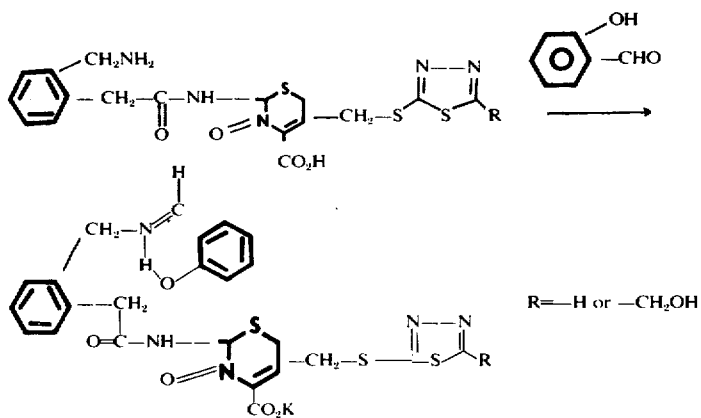
Alternate Syntheses of the Compounds of this Invention
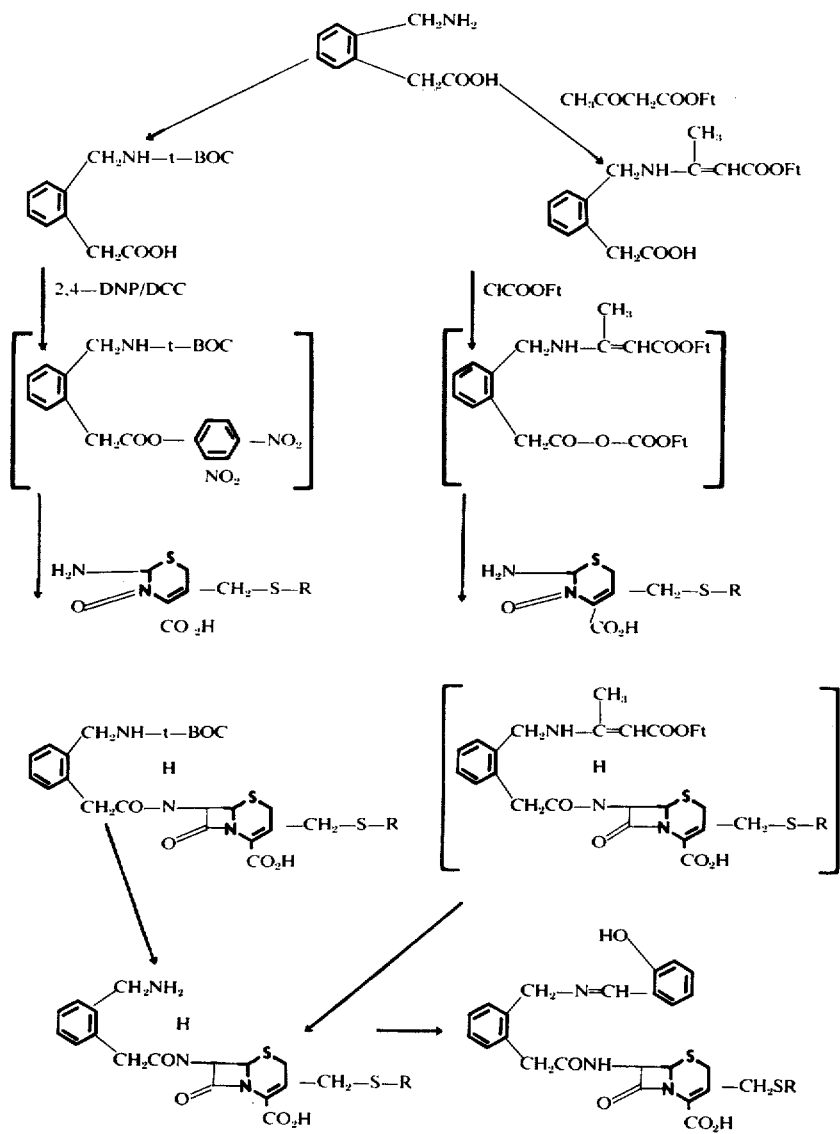
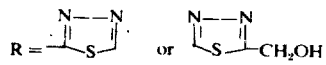

Certain 3-substituted 7-[α-(2-aminomethylphenyl)acetamido]cephalosporanic acid derivatives (A; see Netherlands 72/06326, Farmdoc 76374T, corresponding to U.S. Ser. No. 142,337 filed May 11, 1971) provide a series of parenteral-use cephalosporins which are very effective derivatives with a broad spectrum of activity. Their limited water solubility (< 2 mg./ml.) has, however, caused crystalluria formation even when the antibiotics has been administered parenterally as a readily-dissociable soluble derivative. The object of the present invention was, therefore, to obtain equally active compounds which show higher water solubility as the zwitterion form and do not cause crystalluria.

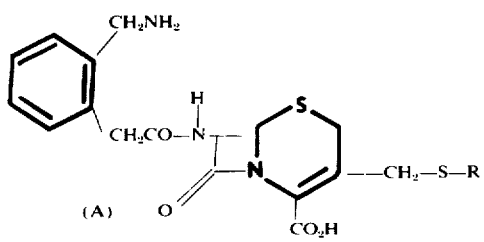

especially wherein R is

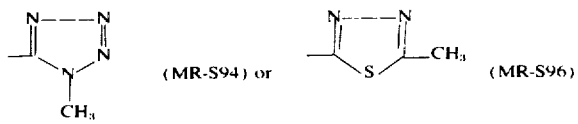

The objective of the present invention was achieved by the provision, according to the present invention of an acid having the formula

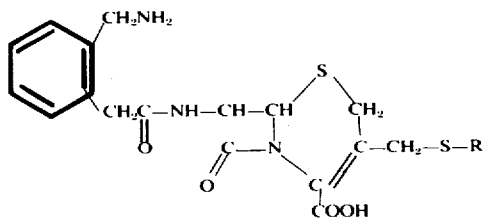

or

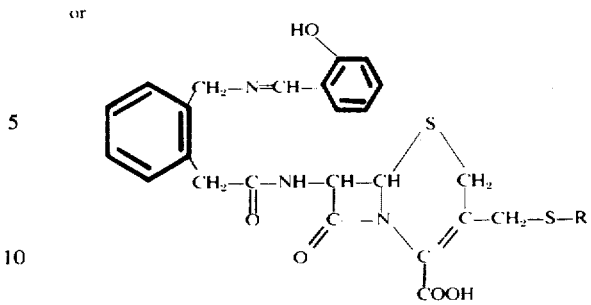

wherein R is

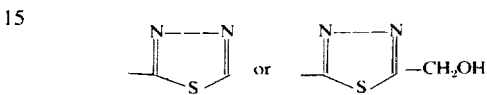

; or a nontoxic, pharmaceutically acceptable salt thereof.

The solubilities were determined in 0.1 M pH 7.0 phosphate buffer.

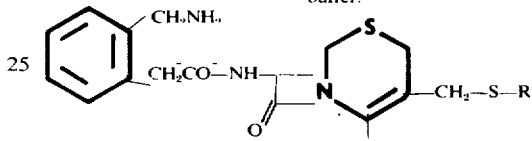

| R = | Solubility | |
|---|---|---|
| <br>N----N<br>⟍N-N⟋<br>\|<br>CH₃ | 1.9 mg./ml. | (1) |
| N----N<br>⟍S⟋—CH₃ | 0.9 mg./ml. | (2) |
| N----N<br>⟍S⟋<br>(BL-S685) | 2.35 mg./ml. | |
| N----N<br>⟍S⟋—CH₂OH<br>(BL-S690) | 2.23 mg./ml. | |

1. This compound (also called MR-S94 is claimed in U.S. Ser. No. 142,337 filed May 11, 1971 (see Netherlands 72/06326; Farmdoc 76,374T).

2. This compound (also called MR-S96) is claimed in U.S. Ser. No. 142,377 filed May 11, 1971 (see Netherlands 72/06326; Farmdoc 76,374T).

STARTING MATERIALS

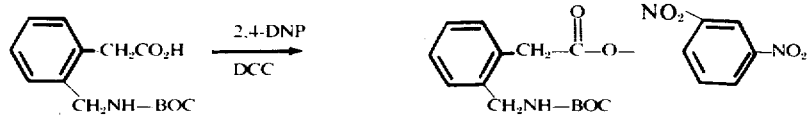

Methyl o-bromomethylphenylacetate

A mixture of methyl o-methylphenylacetate (82.0 g., 0.50 mole), N-bromosuccinimide (89.0 g., 0.50 mole), benzoyl peroxide (1.0 g.) and carbon tetrachloride (800 ml.) was heated under reflux for 2 h. while irradiated with a 750 watt light source. The succinimide was removed by filtration, the solvent removed from the filtrate and the residue distilled in vacuo to give 90.1 g. (74%) of product, b.p. 95°–105° (0.4 mm); n.m.r. ($CCl_4$): singlets at $\tau 2.85$ (4H), 5.50 (2H), 6.31 (2H) and 6.38 (3H).

o-Azidomethylphenylacetic acid

A mixture of methyl o-bromomethylphenylacetate (90.1 g., 0.371 mole), sodium azide (26.0 g., 0.40 mole) and 10% aqueous acetone (750 ml.) was stirred at room temperature for 3 h. The solvent was removed under reduced pressure and the residue treated with ether (300 ml.) and water (100 ml.). The crude methyl o-azidomethylphenylacetate (74.8 g.), obtained after drying and concentrating the ether solution, was dissolved in 150 ml. of methanol. This solution was cooled in ice and treated with 150 ml. 3 N methanolic sodium hydroxide. The mixture was left at room temperature for 1 h., then concentrated to dryness and the residue dissolved in water. The aqueous solution was acidified, the product collected by filtration, dried and recrystallized from ethyl acetate-n-hexane to give 49.5 g. (70%) of the acid, m.p. 116°–118°; n.m.r. ($CDCl_3$): sharp singlets at $\tau 2.75$ (4H), 5.63 (2H) and 6.28 (2H); $\gamma_{max}^{Nujol}$ 2100 and 1700 cm$^{-1}$.

Anal. Calcd. for $C_9H_9N_3O_2$: C, 56.53; H, 4.75; N, 21.98.

Found: C, 56.37; H, 4.65; N, 21.74 o-Aminomethylphenylacetic acid

A mixture of o-azidomethylphenylacetic acid (9.6 g., 0.050 mole), 10% Pd on charcoal (2.5 g.), methanol (150 ml.) and 1 N hydrochloric acid (50 ml.) was hydrogenated at 30 p.s.i. for 3.5 h. The mixture was filtered, concentrated under reduced pressure to a volume of approximately 30 ml. and extracted with ether. From the ether extract 1–2 g. of impure starting material was recovered. The aqueous solution was adjusted to pH 5.0 with dilute ammonium hydroxide and cooled in ice. The white solid precipitate was collected by filtration, washed successively with ice-water, methanol and ether, and dried in vacuo over $P_2O_5$: Yield 5.4 g. (65%), m.p. 179°–181° (decomp.); n.m.r. ($CF_3CO_2H$): $\tau$ 2.54 (s, 4H) 5.48 (q, 2H) and 6.00 (s, 2H).

o-tert-Butoxycarbonylaminomethylphenylacetic acid

Triethylamine (14.4 g., 0.143 mole) was added to an ice-cooled suspension of o-aminomethylphenylacetic acid (10.3 g., 0.0624 mole) in 100 ml. of water followed by the addition of a solution of tert-butoxycarbonyl azide (11.4 g., 0.080 mole) in 75 ml. of THF. The reaction mixture was stirred at room temperature for 16 h., then most of the THF was removed under reduced pressure. The aqueous solution was washed with ether, layered with 125 ml. of ethyl acetate and with ice-cooling brought to pH 3.5 with dilute hydrochloric acid. The ethyl acetate solution was dried, concentrated and the solid residue recrystallized from ethyl acetate-n-hexane (1:1) to give 14.1 g. (87%) of white needles m.p. 114°–116°.

Anal. Calcd. for $C_{14}H_{19}NO_4$: C, 63.39; H, 7.22; N, 5.28.

Found: C, 63.44; H, 7.21; N, 5.42.

2,4-Dinitrophenyl o-tert.-butoxycarbonylaminophenylacetate

N,N'-Dicyclohexylcarbodiimide (1.0 g., 0.0050 mole) was added to an ice-cooled solution of o-tert-butoxycarbonylaminomethylphenylacetic acid (1.33 g., 0.0050 mole) and 2,4-dinitrophenol (0.92 g., 0.0050 mole) in 12 ml. of anhydrous tetrahydrofuran. The reaction mixture was kept at room temperature for one hour, then the precipitated N,N'-dicyclohexylurea was removed by filtration. The solvent was removed from the filtrate to give the activated ester as a viscous yellow oil.

o-tert.-Butoxycarbonoylaminomethylphenylacetic acid can be prepared in quantitative yield from tert.-butoxycarbonyl azide and the amino acid by using triethylamine as the base.

The BOC-amino acid reacts with thionyl chloride in the presence of triethylamine (methylene chloride as solvent) or pyridine (benzene as solvent) to give the BOC-amino acyl chloride which can be directly coupled with the compound of the formula

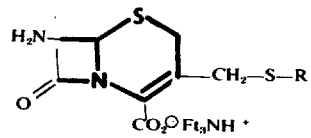

wherein R has the meaning set out above in methylene chloride solution in the presence of triethylamine. The protecting group can subsequently be removed by treatment with cold trifluoroacetic acid.

o-Aminomethylphenylacetic acid is also provided by Beckmann rearrangement of 2-indanone oxime followed by hydrolysis of the resulting lactam according to the following equation:

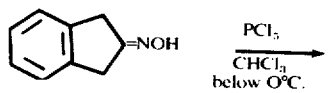 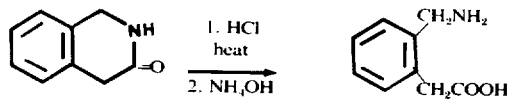

J. Org. Chem. 9, 380–391 (1944) and 28, 2797–2804 (1963).

| Materials | Wt., g. | Vol., ml. | Moles |
|---|---|---|---|
| 2-Indanone oxime | 1000 | | 6.78 |
| Phosphorus pentachloride | 1482 | | 7.13 |
| Chloroform | | 56600 | |
| 10% Sodium Hydroxide Solution | | 680 | |
| "Darko KB" activated charcoal | 1000 | | |

Procedure

1. Dissolve 1000 g. of 2-indanone oxime in 31600 ml. of chloroform at 20°–25° C.

2. Cool the solution to −30° C. [On cooling the 2-indanone oxime solution to −30° C., some of the oxime crystallizes.]

3. Add 1482 g. of phosphorus pentachloride to the vigorously stirred suspension in portions. Control the temperature of the reaction at −28° to −32° C. by the rate of addition of the solid phosphorus pentachloride. [The best results were obtained on running the reaction at −30° C. It can also be successfully run at −10° to −5° C. or perhaps even higher but it appears that more tar and side products are produced which then complicate isolating the lactam.]

4. Stir the reaction at ∼−30° C. for 10 minutes after completing the addition and then warm it to 25° C. over three-fourths hr. During this period the solids dissolve and then a new solid reprecipitates.

5. Stir the reaction at 25° C. for 3 additional hours and then with thorough mixing add it to 31600 ml. of water at 0°–5° C. [The reaction can be followed by TLC (thin layer chromatography). In the system of 8 parts benzene and 2 parts acetic acid the lactam has an Rf = 0.36 and the oxime has as Rf = 0.64. The spots are developed by .05% potassium permanganate spray. The oxime spot may not completely disappear but it should become quite faint.] Subsequent washing operations were conducted at 20°–25° C.

6. Separate the layers and wash the chloroform phase with 15,800 ml. of water.

7. Combine the water fractions and extract them with 15,800 ml. of chloroform.

8. Combine the chloroform fractions, layer with 15,800 ml. of water and with good mixing titrate the mixture to ∼ pH 7 with 10% sodium hydroxide solution. This may take about 680 ml. of sodium hydroxide solution and the titration is slow. [This basic wash is important in removing the tar producing side products. The titration may take 1 to 2 hours.]

9. Separate the layers and wash the chloroform with 15,800 ml. of water.

Combine the water fractions, wash with 9200 ml. of chloroform and combine the chloroform fractions.

11. Carbon treat the chloroform solution with 1000 g. of activated charcoal ("Darko KB") at ∼25° for 15–30 min.

12. Filter the slurry through diatomaceous earth ("Dicalite") wash the cake with chloroform and concentrate the filtrate at reduced pressure to leave o-aminomethylphenylacetic acid lactam as a dry solid.

13. The yield of crude lactam is nearly 100%. It is a yellow crystalline solid. [If the tar making materials have not been removed by the washes, this produce will come out dark. It can be recrystallized from hot water after first adjusting the water slurry to pH 7.0 or from toluene-heptane.]

| Materials | Wt., g. | Vol., ml. | Moles |
|---|---|---|---|
| Crude o-aminomethylphenyl-acetic acid lactam from 1000 g of 2-indanone oxime | ∼1000 | | ∼6.78 |
| Conc. Hydrochloric Acid | | 8000 | |
| "Darko KB" activated charcoal | 100 | | |
| Methylene Chloride | | 6000 | |
| Methyl isobutyl ketone (MIBK) | | As needed | |
| 6 N Ammonium Hydroxide | | As needed | |

Procedure

1. Add 8000 ml. of concentrated hydrochloric acid to the approximately 1,000 g of crude lactam obtained from oxime rearrangement.

2. Stir the mixture and heat it cautiously to reflux for 3 hours. [On heating this reaction an excessive amount of foam is formed as excess HCl leaves. This foam can fill the whole apparatus. It can be reduced by silicon antifoam agent. After the initial foam stage is passed, the reaction can be refluxed without difficulty.]

3. Cool the dark slurry to about 40°–50° C. and add 100 g. of activated charcoal ("Darko KB") and continue stirring.

4. Carbon treat for 15–20 min., filter the slurry through a "Dicalite" cake and wash the cake with about 4000 ml. of hot water.

5. Extract the clear yellow filtrate with 6000 ml. of methylene chloride (one-half volume) and separate the methylene chloride. Save the $CH_2Cl_2$ layer for checking possible recovery of unchanged lactam.

6. Concentrate the water phase at reduced pressure to give solid o-aminomethylphenylacetic acid hydrochloride.

7. Add MIBK to the wet solids and continue the reduced pressure distillation and MIBK addition until all the water has been removed from the solids.

8. Continue the reduced pressure distillation until all the MIBK has been removed from the solids. [The MIBK distillation not only azeotropes the water but also takes excess HCl with it.]

9. Redissolve the solids in 3900 ml. of water and add 650 ml. of MIBK.

10. While stirring at 20°–25° C. adjust the pH of the solution to 5.0 with 6 N ammonium hydroxide. The o-aminomethylphenylacetic acid zwitterion starts to crystallize at about pH 3.5.

11. Stir the zwitterion slurry and cool it to 0°–5° C. for 1 hr.

12. Filter the slurry, wash the cake carefully with ∼1000 ml. of ice cold water, then 2,000 ml. of MIBK and then 5,000 ml. of ice cold acetone. The combined filtrate and washes should be checked for lactam content.

13. Suck the cake dry and then dry it in an air circulating oven at 45° C. The yield is 670–730 g.; 60–65% based on oxime.

14. The reactions and processing may be followed by TLC using the solvent system 5 acetone, 1.5 benzene, 1.0 acetic acid, 1.5 water; developed by $KMnO_4$; $R_f$ lactam = 0.88, $R_f$ amino acid = 0.69.

o-Aminomethylphenylacetic acid hydrochloride

In a 500 ml. round-bottom flask, fitted with a reflux condenser, and a magnetic stirrer, is placed 10.1 g. (0.075 moles) of o-aminomethylphenylacetic acid lactam and 100 ml. of concentrated hydrochloric acid. The mixture is then refluxed for 3 hr. While hot, the reaction mixture is treated with 2.0 g. of charcoal ("Darko KB") for 5 min., and filtered. The filtrate is concentrated to dryness at 50°–60°/15mm and finally at high vacuum over $P_2O_5$ (Note 1). The solid is recrystallized from a preformed mixture of acetone:water, 15:1 (Note 2). The hydrochloride is dried in a vacuum desiccator over $P_2O_5$. The yield of the pure product, melting at 188°–190°, is 11.4 g. (78%).

Anal. Calcd. for $C_9H_{12}NO_2Cl$: C, 53.73; H, 5.97; N, 6.96; Cl, 17.66.

Found: C, 53.56; H, 6.02; N, 6.89; Cl, 17.76.

Notes

1. For a successful recrystallization absolutely dry material is needed.
2. The ratio of acetone to water may vary, depending on the dryness of the crude hydrochloride.

Potassium o-[1-carbomethoxypropen-2-ylaminomethyl]-phenylacetate

In a 2000 ml. round-bottom flask, fitted with a reflux condenser and an overhead stirrer, was placed 45.92 g. (0.28 moles) of o-aminomethylphenylacetic acid, 15.28 g. (0.28 moles) of KOH, 64.96 g. (0.56 moles) of methyl acetoacetate and 1500 ml. of absolute methanol. The mixture was then refluxed for 3 hr. The solution was then concentrated to a small volume (100-150 ml.), filtered and diluted with 400-700 ml. of anhydrous ether. Upon scratching, the product crystallized out. The solid was filtered and dried in a vacuum desiccator over $P_2O_5$. (The solid material was extremely hygroscopic. It should be filtered as quickly as possible and should not be air-dried.) The yield of product, melting at 140°–148°, was 84.1 g. (99%).

Anal. calcd. for $C_{14}H_{16}NO_4K$: C, 54.20; H, 5.49; N, 4.52; KF, 2.90.

Found: C, 53.72; H, 5.44; N, 4.56; KF, 2.92

Sodium o-(1-ethoxycarbonyl-1-propen-2-ylaminomethyl)phenylacetate

To a ethanolic solution g. sodium ethoxide which was prepared from 0.6 g (0.026 atom) of metallic sodium and 50 ml. of absolute ethanol were added 4.27 g. (0.026 mole) of o-aminomethylphenylacetic acid and 3.38 g. (0.026 mole) of ethyl acetoacetate and the mixture was refluxed for 6 hours. The mixture was evaporated to dryness and the residue was recrystallized from ethanol to give 6.36 g. (82%) of sodium o-[1-ethoxycarbonyl-1-propen-2-ylaminomethyl]phenylacetate as colorless needles melting at 230°–232° C.

IR: 65 $_{max}^{KBr}$ 3320, 1645, 1605, 1470, 1395, 1275, 1180 cm$^{-1}$.

Anal. calcd for $C_{15}H_{18}NO_4Na$: C, 60.20; H, 6.06; N, 4.68.

Found: C, 59.95; H, 5.86; N, 4.67.

t-Butoxycarbonyl azide

To a cooled solution of 100 g. (0.76 mole) of t-butyl carbazate in 87 g. of glacial acetic acid and 120 ml. of water was added dropwise a solution of 60 g. (0.85 mole) of sodium nitrite in 50 ml. of water over a period of 40 minutes, the temperature being kept at 10°–15° C. After the addition was completed the stirring was continued for an additional 30 min. at the same temperature. To the mixture was added 100 ml. of water and a separated oil was extracted with five 100 ml. portions of methylene chloride. The combined organic extracts were washed with 100 ml. of 10% sodium bicarbonate solution and 100 ml. of water successively, and dried over anhydrous sodium sulfate. The methylene chloride was removed under diminished pressure on a water bath maintained at 40°–45° C. The residual azide was distilled and collected at 45°C./20 mm Hg. It weighed 92.7 g. (84%).

o-(t-Butoxycarbonylaminomethyl)phenylacetic acid

To a solution of 70 g. (0.35 mole) of o-aminomethylphenylacetic acid hydrochloride and 116 g. (1.15 moles) of triethylamine (TEA) in 400 ml. of water was added dropwise a solution of 64 g. (0.45 mole) of t-butoxycarbonyl azide in 300 ml. of tetrahydrofuran (THF) under stirring at 0° C. After the addition was completed, the temperature was allowed to rise to room temperature and the stirring was continued for 20 hours. The tetrahydrofuran was distilled off below 40° C. and the aqueous solution was washed with 200 ml. of ether, layered with 200 ml. of ethyl acetate and acidified with dil. hydrochloric acid to pH 3 under cooling at 0° C. The organic layer was separated and the aqueous layer was extracted with four 200 ml. portions of ethyl acetate. The combined ethyl acetate solution was washed with 200 ml. of water, dried over anhydrous sodium sulfate and concentrated in vacuo. The concentrate was treated with 500 ml. of n-hexane to give 87.9 g. (95%) of o-(t-butoxycarbonylaminomethyl)phenylacetic acid as colorless needles melting at 114°–116° C.

2,4-Dinitropphenyl o-t-butoxycarbonylaminomethylphenylacetate

Dicyclohexylcarbodiimide (17.72 g., 0.086 mole) (DCC) was added in one portion to a mixture of o-(t-butoxycarbonylaminomethyl)phenylacetic acid (22.73 g., 0.086 mole) and 2,4-dinitrophenol (15.82 g., 0.086 mole) (2,4-DNP) in 250 ml. of THF. The reaction mixture was stirred for 2 hours at room temperature. The precipitated dicyclohexylurea was filtered off and washed with 100 ml. of THF. The filtrate and washings were combined and concentrated under reduced pressure below 50° to give a viscous yellow oil which was triturated with n-hexane (150 ml.) to afford 2,4-dinitrophenyl o-t-butoxycarbonylaminomethylphenylacetic acid as yellow needles. Yield 34.9 g. (94%). m.p. 76°–77° C.

IR: $\gamma_{max}^{KBr}$ 3340, 1785, 1685, 1610, 1540, 1530, 1500, 1340 cm$^{-1}$.

Anal. Calcd. for $C_{20}H_{21}N_3O_8$: C, 55.68; H, 4.91; N, 9.74.

Found: C, 55.70; H, 5.05; N, 9.93.

o-tert.-Butoxycarbonylaminomethylphenylacetic acid can be prepared in quantitative yield from tert.-butoxycarbonyl azide and the amino acid by using triethylamine as the base.

The BOC-amino acid reacts with thionyl chloride in the presence of triethylamine (methylene chloride as solvent) or pyridine (benzene as solvent) to give the BOC-amino acyl chloride which can be directly coupled with the compound of the formula

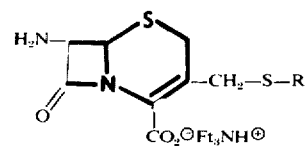

wherein R has the meaning set out above in methylene chloride solution in the presence of triethylamine. The protecting group can subsequently be removed by treatment with cold trifluoroacetic acid.

7-Amino-3-[2-(1,3,4-thiadiazolyl)-thiomethyl]-3-cephem-4-carboxylic acid

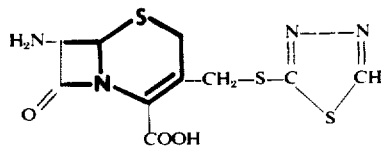

2-Mercapto-1,3,4-thiadiazole

The procedure of J. Goerdeler, J. Ohm and O. Tegtmeyer, *Berichte*, 89, 1534 (1956) was followed. To a solution of 160 ml. of 48% hydrobromic acid and 100 mg. of powdered copper at −7° was added slowly with alternation 13.6 g. (0.1mole) of 2-amino-1,3,4-thiadiazole (Eastman) and 32 g. of sodium nitrate in small portions over a period of ½ hour. The mixture was stirred for 1 ½ hours at 0° and for 1 hour at room temperature. The mixture was then neutralized with 50% potassium hydroxide to pH 9.5. The mixture was filtered and the filtrate was continuously extracted with ether for 6 hours. The ether was evaporated to 15 mm (25°) to a solid which was dissolved in 40 ml. of ethyl alcohol and treated with 5 g. of thiourea. The solution was heated at reflux for 1 ½ hours. A solution of 4.5 g. of potassium hydroxide in 65 ml. of water was added and the mixture was heated at reflux for an additional 1 ½ hours. The alcohol was evaporated at 15 mm. (32°) and the aqueous residue was neutralized with concentrated hydrochloric acid to pH 3.5. After cooling for 2 hours in an ice bath 3.5 g. of 2-mercapto-1,3,4-thiadiazole as yellow crystals were collected adn weighed 3.5 g. M.p. 125°–127°. The IR and NMR spectra were consistent for the structure.

7-Amino-3-(1,3,4-thiadiazolyl)-thiomethyl]-3-cephem-4-carboxylic acid -[2-(

To a suspension of 8.1 g. (.03 mole) of 7-aminocephalosporanic acid and 3.5 g. (.03 mole) 2-mercapto-1,3,4-thiadiazole in 200 ml. of .1 M phosphate buffer (pH 6.5) was added with stirring 5.4 g. (.064 mole) of sodium bicarbonate. The mixture was stirred at 55° under nitrogen and all of the solid dissolved. The stirring was continued for 3 hours and the solution was cooled to 5° and adjusted to pH 5 with glacial acetic acid. The mixture was stored for 2 hours and the product, 7-amino-3-[2-(1,3,4-thiadiazolyl)-thiomethyl]-3-cephem-4-carboxylic acid, was collected and weighed 9 g., M, 140° (slow decomp.) The IR and NMR spectra were consistent for the structure.

7-Amino-3-[2-(5-hydroxymethyl-1,3,4-thiadiazolyl)thiomethyl]-3-cephem-4-carboxylic acid

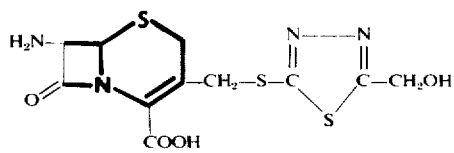

1-Hydroxyacetylthiosemicarbazide

A mixture of 18.2 g. (0.2 mole) of thiosemicarbazide and 30.4 g. (0.4 mole) of glycolic acid was heated together at 80°–90° for 2 hours with good stirring. The mixture was cooled at room temp. and washed with cold abs. alcohol. The solid was collected and air dried to weigh 40 g. The product was recrystallized from 100 ml. of boiling 50% alcohol to yield 23 g. of the crystalline 1-hydroxyacetylthiosemicarbazide. M.p. 189°–190°; Anal. Calcd. for $C_3H_7N_3OS$, C, 24.18; H, 4.74; N, 28.21; S, 21.51.

Found: C, 24.08; H. 4.50; N, 27.67; S, 21.35. The IR and NMR spectra were consistent for the structure.

2-Acetoxymethyl-5-amino-1,3,4-thiadiazole

A mixture of 22.4 g. (0.15 mole) of 1-hydroxyacetylthiosemicarbazide and 60 ml. of acetyl chloride was stirred at room temperature for 2 hours and then heated to 40° until all the solid had dissolved (ca. 2 hours). The acetyl chloride was removed under reduced pressure 40° (15 min.) and the residue was stirred with 100 ml. of ice water. The mixture was adjusted to pH 9.2 with 10% KOH and the product was collected. The crude solid was recrystallized from absolute alcohol to yield after air drying 6 g. of crystalline 2-acetoxymethyl-5-amino-1,3,4-thiadiazole, M.p. 191°–192° C.

Anal. Calcd. for $C_5H_7N_3O_2S$: C, 34.63; H, 4.07; N, 24.26.

Found: C, 35.16; H, 4.35; N, 24.38.

2-Hydroxymethyl-5-mercapto-1,3,4-thiadiazole

The procedure of Goerdler et al. was followed using 34.6 g. grams (0.2 mole) of 2-acetoxymethyl-5-amino-1,3,4-thiadiazole and 64 grams (0.9 mole) of sodium nitrite in 320 ml. of 48% hydrobromic acid and 0.1 gram of powedered copper. The bromo compound was treated with 7.6 grams (0.1 mole) of thiourea and 11.2 grams of potassium hydroxide in 25 ml. of water. Upon acidification with 6 N hydrochloric acid the mercaptan was extracted in ethyl acetate and treated with 17 grams of potassium 2-ethylhexanoate. The potassium salt was collected, washed with ethyl acetate and dried to weigh 12.2 grams. The salt was recrystallized from acetone-water to give 7.6 grams of crystalline potassium 2-hydroxymethyl-5-mercapto-1,3,4-thiadiazole, M.p. 130°–131°C.

Anal. Calcd. for $C_3H_3KN_2S_2O\cdot H_2O$: C, 17.64; H, 2.46; N, 13.70.

Found: C, 17.81; H, 2.43; N, 13.66

The IR and NMR spectra were consistent for the structure.

7-Amino-3-[2-(5-hydroxymethyl-1,3,4-thiadiazolyl)thiomethyl]-3-cephem-4-carboxylic acidi The procedure followed was the same as the procedure for the unsubstituted thiadiazole using 2.25 g. (0.012 mole) of mercaptan, 3.3 g. (0.012 mole) of 7-amino cephalosporanic acid and 1 g. (0.012 mole) of sodium bicarbonate in 100 ml., 1 M phosphate buffer to yield 3.15 g. of tan, solid 7-amino-3-[2-(5-hydroxymethyl-1,3,4-thiadiazolyl)thiomethyl]-3-cephem-4-carboxylic acid, M.p. 170°–175°C. decomp. The IR and NMR spectra were consistent for the structure.

The following examples are given in illustration of, but not in limitation of, the present invention. All temperatures are given in degrees Centigrade. "Skellysolve B" is a petroleum ether fraction of B.P. 60°–68° C. consisting essentially of n-hexane. IR-120 is also called Amberlite IR-120 and is a strong cation exchange resin containing sulfonic acid radicals. Amberlite IR-120 is a commercially available cation exchange resin of the polystyrene sulfonic acid type; it is thus a nuclear sulfonated polystyrene resin cross-linked with divinyl benzene obtained by the procedure given by Kunin, Ion Exchange Resins, 2nd. Edition (1958), John Wiley and Sons, Inc. Therein see pages 84 and 87 for example.

DESCRIPTION OF THE PREFERRED EMBODIMENTS

EXAMPLE 1

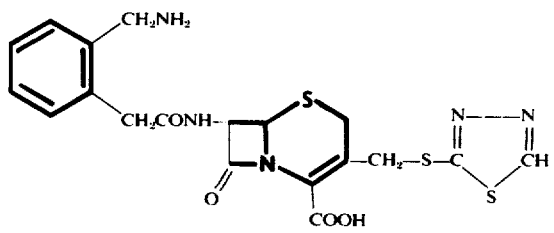

7-[2-Aminomethylphenylacetamido]-3-[2-(1,3,4-thiadiazolyl)thiomethyl]-3-cephem-4-carboxylic acid.

A mixture of 4.8 g. (0.015 mole) of sodium 2-N-(1-carbethoxypropen-2-yl)aminomethyl-phenyl acetate and 5 drops of N,N-dimethylbenzylamine in 94 ml. of tetrahydrofuran at −40° was stirred vigorously with 2.1 g. (0.0156 mole) of isobutylchloroformate. The mixture was stirred for 5 minutes and added to a solution of 3.8 g. (.01 mole) of 7-amino-3-[2-(1,3,4-thiadiazolyl)thiomethyl]-3-cephem-4-carboxylic acid and 2.9 ml. of N-methylmorpholine in 53 ml. of water at 3°. The resulting solution was stirred for 2 hours and the tetrahydrofuran was evaporated at 30° at 15 mm. The solution was adjusted to pH 6.5 with conc. hydrochloric acid and stored for 3 hours at 5°. The cepHalosporin was collected and weighted 2.3 g., m.p. > 140° decomp.

Anal. Calcd. for $C_{19}H_{19}N_5O_5S_3 \cdot H_2O$: C, 44.64; H, 4.14; N, 13.69.

Found: C, 44.81; H, 4.31; N, 13.46.

The IR and NMR spectra were consistent for the structure.

EXAMPLE 2

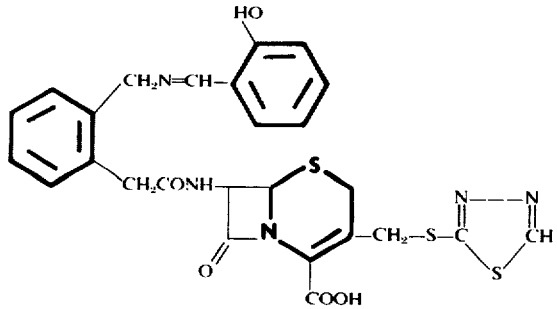

Potassium 7-[(2-N-salicylideneaminomethylphenyl)acetamido]-3-[2-(1,3,4-thiadiazolyl)thiomethyl]-3-cephem-4-carboxylic acid.

To one gram (0.02 mole) of the corresponding cephalosporanic acid from Example 1 in 15 ml. of methanol was added 280 mg. (0.023 mole) of salicylaldehyde and 200 mg. (0.020 mole) of triethylamine. The solution was heated to 50° on the steam-bath, filtered and 360 mg. of potassium 2-ethylhexanoate was added. The methanol was evaporated at 30° (15 min.) to one-half volume and the potassium salt was collected and weighed 650 mg., m.p. 145° decomp.

Anal. Calcd. for $C_{26}H_{24}KN_5O_5S_3 \cdot h_2O$: C, 48.96; H, 33.79; N, 10.98. Found: C, 48.99; H, 4.04; N, 10.55. The IR and NMR were consistent for the structure.

EXAMPLE 3

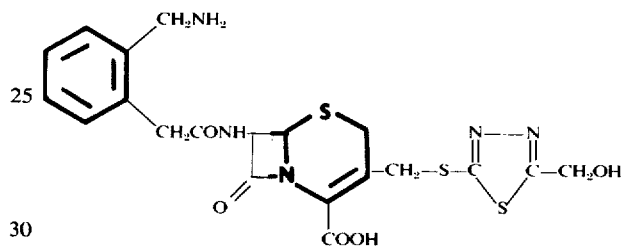

7-(2-Aminomethylphenylacetamido)-3-[2-(5-hydroxymethyl-1,3,4-thiadiazolyl)thiomethyl]-3-cephem-4-carboxylic acid.

The procedure followed was the saem as the procedure used for the unsubstituted 1,3,4-thiadiazole cephalosporin in Example 1. The enamine 3.6 g. (0.012 mole), isobutyl chloroformate, 1.6 g. (.012 mole) and 0.4 ml. of N,N-dimethylbenzylamine in 71 ml. of tetrahydrofuran at −40° was added to a solution of 2.9 g. (0.1 mole) of the amino-cephalosporanic acid in 2.3 ml. of N-methylmorpholine and 41 ml. of water at 0°. A yield of 1.6 g. was obtained m.p. > 140° decomp.

Anal. Calcd. for $C_{20}H_{21}N_5O_5S_3 \cdot H_2O$: C, 45.69: H, 4.40; N, 13.32. Found: C, 45.34; H, 4.30; N, 12.91. The IR and NMR spectra were consistent for structure.

EXAMPLE 4

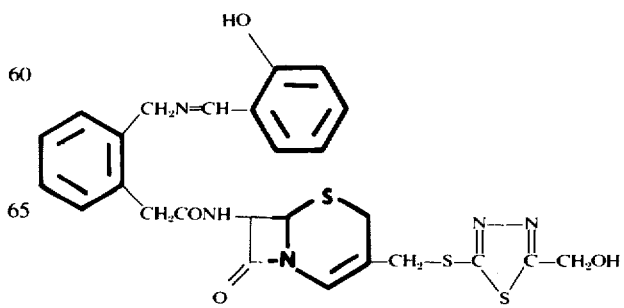

Potassium 7-[(2-N-Salicylideneaminomethylphenylacetamido]-3-[2-(5-hydroxymethyl-1,3,4-thiadiazolyl)thiomethyl]-3-cephem-4-carboxylic acid.

The procedure used was the same as the procedure used for the unsubstituted thiadiazole. The 750 mg. (0.0015 mole) of cephalosporin from Example 3, 162 mg. (0.0016 mole) of triethylamine, 219 mg. (0.0018 mole) of salicylaldehyde and 292 mg. (0.0016 mole) of potassium 2-ethylhexanoate in 10 ml. of methanol gave 530 mg. of yellow crystals. M.p. >140° slow decomp.

Anal. Calcd. for $C_{27}H_{24}KN_5O_6S_3$: C, 48.55; H, 3.92; N, 10.34. Found: C, 49.03; H, 4.48; N, 10.28.

The IR and NMR spectra were consistent for the structure.

EXAMPLE 5

The potassium salt of the compound of Example 1 was prepared by adding a solution of potassium 2-ethylhexanoate (KEH) in ethyl acetate to a solution of the cephalosporin (zwitterion) in DMSO to precipitate the desired potassium salt.

EXAMPLE 6

The sodium salt of the compound of Example 3 was prepared by pre-formation of its diethylammonium salt in methanol followed by addition of a solution of sodium 2-ethylhexanoate (SEH) in ethyl acetate and then dilution with isopropanol to precipitate the desired sodium salt which had a high solubility in water.

The following table illustrates the potent in vitro activity of the compounds of the present invention and also illustrates the marked decrease in activity, particularly against Gram-negative bacteria, produced by seemingly minor variations in the thiol attached at the 3-position.

M.I.C. ($\mu$/ml.)

| Nutrient Broth Organism | | Ex. 1 MR-S 94 | Ex. 1 MR-S 96 | Ex. 3 BL-S 685 | Ex. 3 BL-S 690 | BL-S 664 | BL-S 683 | BL-S 684 | BL-S 692 | BL-S 693 | BL-S 695 | BL-S 696 |
|---|---|---|---|---|---|---|---|---|---|---|---|---|
| D. pneumoniae* (10⁻³)** | A9585 | .008 | .016 | .004 | .008 | .03 | .004 | .016 | .008 | .016 | .03 | .008 |
| Str. pyogenes* (10⁻³)** | A9604 | .008 | .016 | .004 | .008 | .03 | .004 | .016 | .008 | .016 | .06 | .016 |
| S. aureus Smith (10⁻⁴) | A9537 | .06 | .013 | .06 | .013 | 0.13 | .03 | 0.25 | .06 | 0.13 | 0.25 | 0.13 |
| S. aureus+50% serum (10⁻¹) | A9537 | 0.13 | 0.25 | 0.13 | 0.25 | 0.25 | 0.13 | 0.25 | 0.5 | 0.5 | 0.5 | 0.25 |
| S. aureus BX1633 (10⁻³) | A9606 | 0.16 | 0.25 | .08 | 0.16 | 0.3 | .08 | 0.6 | 0.16 | 0.3 | 0.6 | 0.3 |
| S. aureus BX1633 (10⁻²) | A9606 | 0.3 | 0.25 | 0.16 | 0.3 | 0.6 | .08 | 1.3 | 0.16 | 0.3 | 0.6 | 0.6 |
| S. aureus Meth.–Res (10⁻³) | A15097 | 1 | 2 | 0.5 | 1 | 1 | 0.5 | 2 | 0.5 | 4 | 2 | 2 |
| Sal. enteritidis (10⁻⁴) | A9531 | .08 | 0.16 | .04 | 0.16 | 0.3 | 0.16 | 0.6 | 0.16 | 0.6 | 0.6 | 0.3 |
| F. coli Juhl (10⁻¹) | A15119 | 0.3 | 0.6 | 0.3 | 0.3 | 0.6 | 0.6 | 2.5 | 2.5 | 2.5 | 2.5 | 1.3 |
| F. coli (10⁻¹) | A9675 | 1 | 2 | 2 | 1 | 1 | 2 | 4 | 4 | 8 | 4 | 4 |
| K. pneumoniae (10⁻⁴) | A9977 | .08 | 0.6 | 0.16 | 0.16 | 0.6 | 0.3 | 1.3 | 1.3 | 2.5 | 1.3 | 0.6 |
| K. pneumoniae (10⁻¹) | A15130 | 1 | 2 | 0.5 | 0.5 | 2 | 1 | 2 | 16 | 4 | 4 | 2 |
| Pr. mirabilis (10⁻¹) | A9900 | 0.3 | 0.6 | 0.16 | 0.3 | 0.6 | 0.3 | 1.3 | 1.3 | 1.3 | 1.3 | 1.3 |
| Pr. morganii (10⁻¹) | A15153 | 2 | 4 | 4 | 4 | 16 | 4 | 16 | 16 | 63 | 63 | 16 |
| Ps. aeruginosa (10⁻¹) | A9843A | >125 | >125 | >125 | >125 | >125 | >125 | >125 | >125 | >125 | >125 | >125 |
| Ser. marcescens (10⁻¹) | A20019 | 8 | 16 | 16 | 16 | 63 | 63 | 125 | >125 | >125 | 125 | 125 |
| Ent. cloacae (10⁻¹) | A9656 | 32 | 63 | 125 | 16 | 125 | 125 | 125 | 125 | 125 | 63 | 125 |
| Ent. cloacae (10⁻¹) | A9657 | 0.16 | 0.3 | 0.16 | 0.16 | 0.25 | 0.3 | 1.3 | 2.5 | 1.3 | 1.3 | 0.3 |
| Ent. cloacae (10⁻¹) | A9659 | 1 | 2 | 1 | 1 | 4 | 4 | 8 | 1 | 32 | 16 | 4 |

*45% Antibiotic Assay Broth + 5% serum + 50% Nutrient Broth.
**Dilution of overnight broth culture.

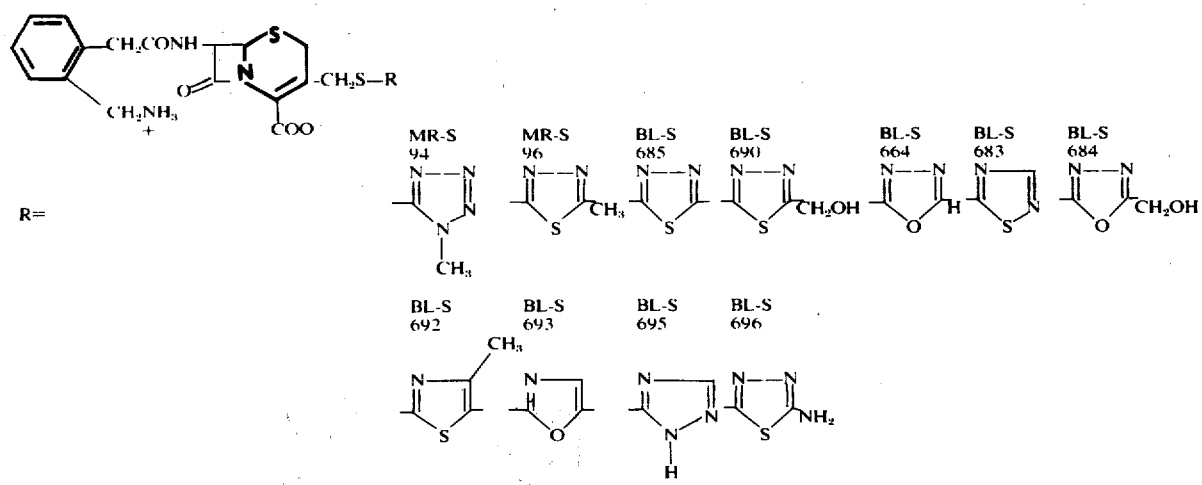

BL-S685 and bl-s690 have an antibacterial spectrum that is similar to that of MR-S94 but are about 2-fold less active. However, they are somewhat more soluble (2.5 –3.5 mg./ml.) in water than MR-S94. Blood level studies show that they give peak levels following IM administration of 10 mg./kg. that are comparable to that of MR-S94. Neither was absorbed to a significant degree when administered orally. The percentage of these drugs bound to human serum proteins was 52 for BL-S685 and 36 for BL-S690 as compared to 51 for MR-S94. In rat crystalluria studies BL-S685 and BL-S690 gave satisfactory high serum and urine concentrations without any evidence of crystalluria.

We claim:

1. The acid having the formula

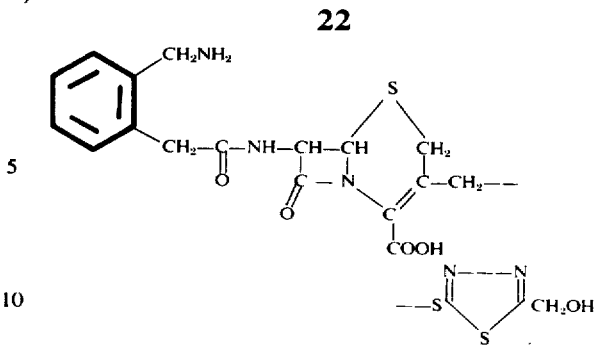

2. The sodium salt of the acid of claim 1.
3. The potassium salt of the acid of claim 1.
4. The zwitterion form of the acid of claim 1.
5. A nontoxic, pharmaceutically acceptable salt of the acid of claim 1.

* * * * *